(12) United States Patent
Tseng

(10) Patent No.: US 9,572,239 B2
(45) Date of Patent: Feb. 14, 2017

(54) STATIC ELECTRICITY PREVENTION DEVICE

(71) Applicant: HON HAI PRECISION INDUSTRY CO., LTD., New Taipei (TW)

(72) Inventor: Min-Tsang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 342 days.

(21) Appl. No.: 14/265,379

(22) Filed: Apr. 30, 2014

(65) Prior Publication Data

US 2014/0340809 A1  Nov. 20, 2014

(30) Foreign Application Priority Data

May 20, 2013 (TW) .............................. 102117809 A

(51) Int. Cl.
| | |
|---|---|
| *H05F 3/00* | (2006.01) |
| *H05F 3/04* | (2006.01) |
| *H05F 3/06* | (2006.01) |
| *B29C 45/17* | (2006.01) |
| *B29C 45/42* | (2006.01) |
| *B25J 15/02* | (2006.01) |
| *B25J 19/00* | (2006.01) |
| *H02H 1/00* | (2006.01) |
| *H02H 1/04* | (2006.01) |
| *H02H 3/22* | (2006.01) |
| *H05F 3/02* | (2006.01) |

(52) U.S. Cl.
CPC .............. *H05F 3/06* (2013.01); *B25J 15/0226* (2013.01); *B25J 19/00* (2013.01); *B29C 45/17* (2013.01); *B29C 45/4225* (2013.01)

(58) Field of Classification Search
CPC .............. H05F 3/06; B25J 19/06; B25J 19/00; B25J 15/0226; B29C 45/4225
USPC ......................................................... 361/213
See application file for complete search history.

(56) References Cited

U.S. PATENT DOCUMENTS

| | | | |
|---|---|---|---|
| 6,427,096 B1* | 7/2002 | Lewis ............... | H01L 21/67379 414/222.07 |
| 2008/0223101 A1* | 9/2008 | Moeck ................. | B25J 15/0226 72/306 |
| 2009/0116950 A1* | 5/2009 | Sirocchi ............... | B65G 47/082 414/801 |
| 2010/0073842 A1* | 3/2010 | Fujiwara ................. | H01T 23/00 361/220 |

\* cited by examiner

*Primary Examiner* — Thienvu Tran
*Assistant Examiner* — Lucy Thomas
(74) *Attorney, Agent, or Firm* — Zhigang Ma

(57) ABSTRACT

A static electricity prevention device includes a main body, an air ionizing generator, a first griping arm, a second griping arm and a driving unit. The main body includes a receiving cavity. The air ionizing generator is fixed on the main body and configured for ejecting ionized air. The first griping arm and the second griping arm each comprises a gripping end and a supporting end connected with the gripping end, the first griping arm and the second griping arm are pivotally mounted on the ends of the main body. The driving unit is arranged in the receiving cavity, and configured for driving the supporting end to rotate, and in order to open or close the gripping end.

8 Claims, 3 Drawing Sheets

STATIC ELECTRICITY PREVENTION DEVICE

FIELD

The present disclosure relates to static electricity prevention devices used in injecting molding.

BACKGROUND

Plastic products, such as lenses, lens barrels and spacer rings are widely used in electrical devices, and these products are mass produced adopting injection molding method due to the short molding cycle and high precision. Static electricity is generated in the injecting molding process when the mold is opened and closed rapidly, static electricity will easily cause the lightweight plastic products to disperse.

DETAILED DESCRIPTION

Figure 1:
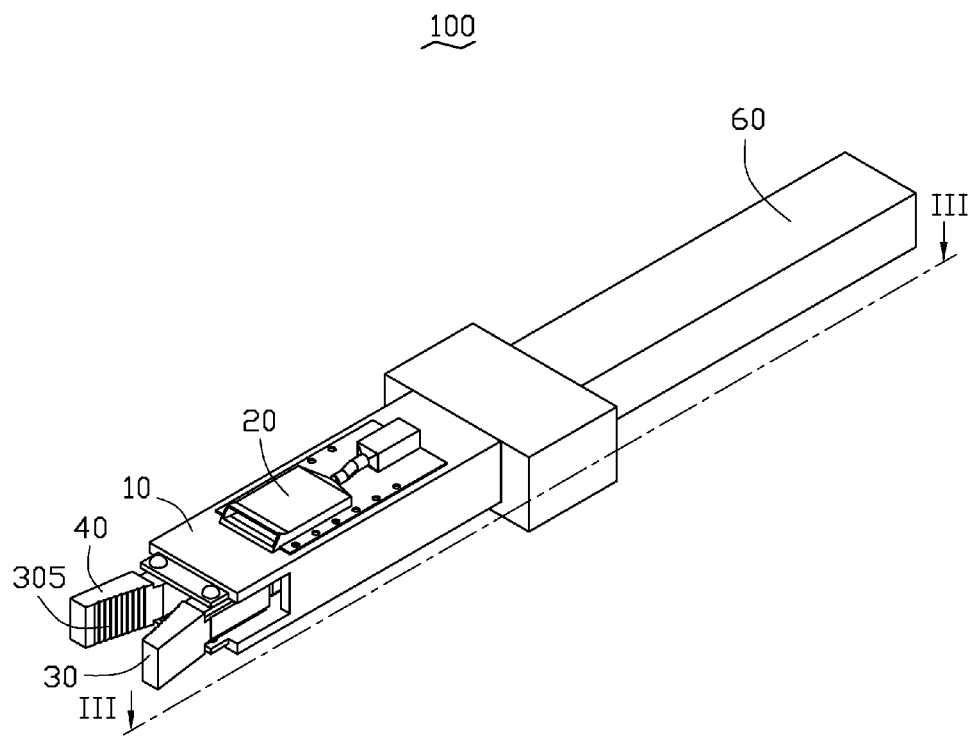
FIG. 1 is an isometric view of a static electricity prevention device in accordance with an exemplary embodiment.
Figure 2:
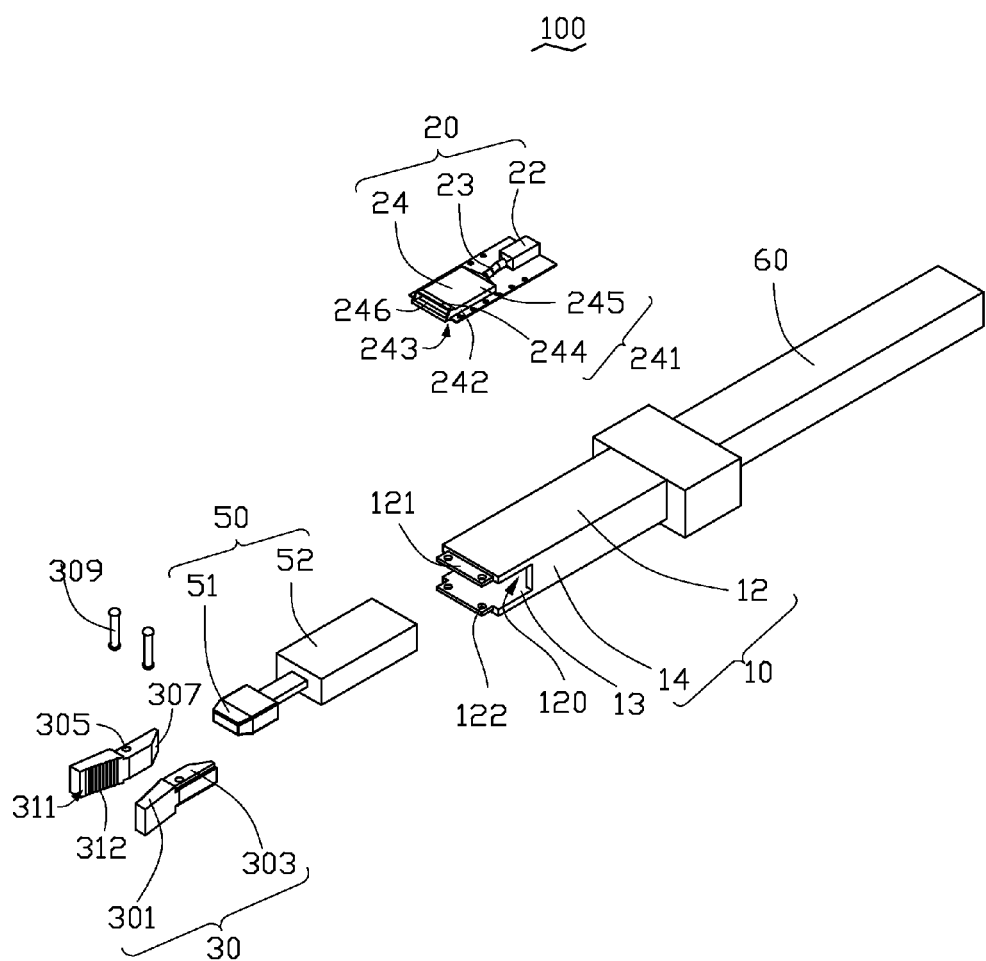
FIG. 2 is an explode view of the static electricity prevention device of FIG. 1
Figure 3:
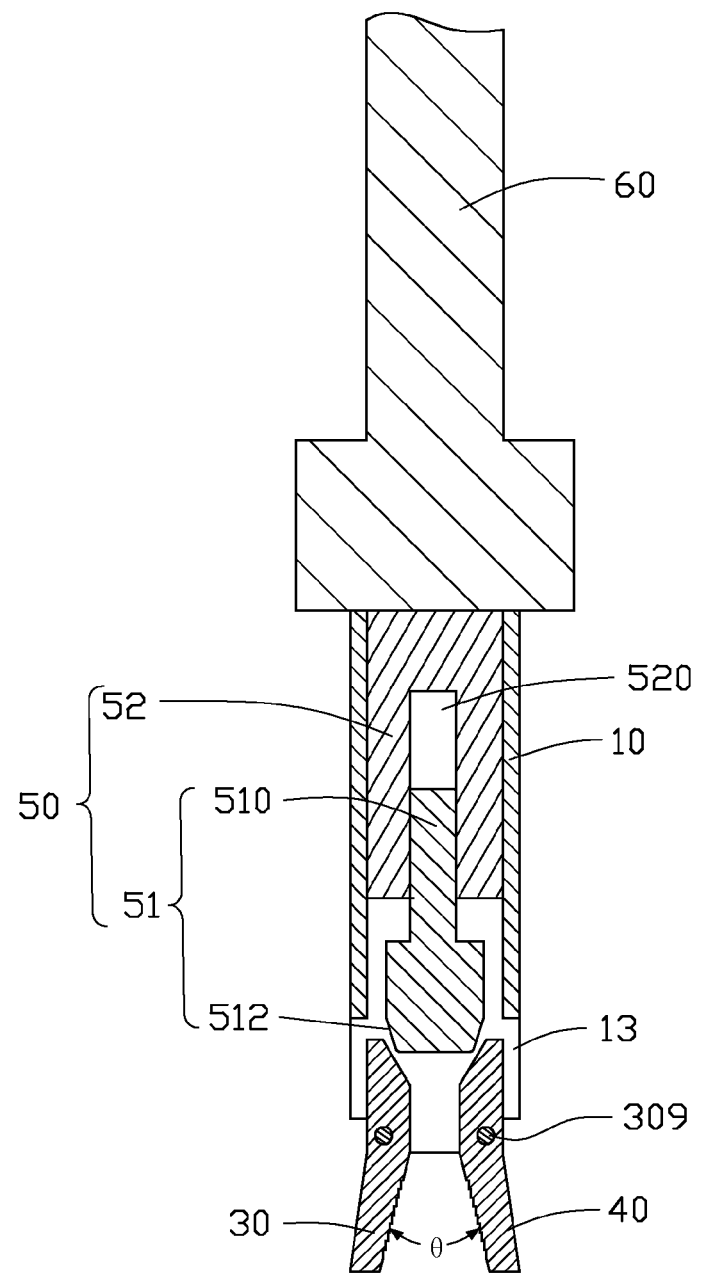
FIG. 3 is a cross-sectional view of the static electricity prevention device of FIG. 1.

FIGS. 1-3 illustrate a static electricity prevention device 100 according to an exemplary embodiment. The static electricity prevention device 100 generally includes a main body 10, an air ionizing generator 20, a first griping arm 30, a second griping arm 40, a driving unit 50 and a manipulator 60.

The main body 10 is coupled with the manipulator 60. The main body 10 includes two pairs of first and second side blocks 12 and 14, each pair of first and second side blocks 12 and 14 are parallel to each other, and both pairs formed together define a receiving cavity 120. A length of the second side block 14 is shorter than a length of the first side block 12, and a slot 13 is formed between the first side block 12 and the second side block 14. The first side block 12 includes a mounting part 121 defining two screw nuts 122 on an end.

The air ionizing generator 20 is mounted on one of the first side blocks 12 and configured for ejecting ionized air. The air ionizing generator 20 includes an ionized air generating device 22, an output nozzle 24 and a pipeline 23 connecting the output nozzle 24 and the ionized air generating device 22.

The output nozzle 24 is substantially cubic, the output nozzle 24 includes a first panel 241, two second panels 242, and a third panel 243. The first panel 241 is substantially parallel to the third panel 243, the two second panels 242 are perpendicularly connected between the first panel 241 and the third panel 243. The first panel 241 includes a first part 244 and a second part 245 connecting to the first part 244. The first part 244 is parallel with the third panel 243. The second part 245 is tilted along a direction of away from the third panel 243, and an outlet 246 is formed by a terminus of the third panel 243, the two second panels 242 and the second part 245, allowing ionized air to blow at a direct angle towards an injecting machine.

The first griping arm 30 and the second griping arm 40 are pivotally mounted on the main body 10 opposite to the manipulator 60. The first griping arm 30 is arranged opposite to the second griping arm 40. The first griping arm 30 and the second griping arm 40 each comprise a gripping end 301 and a supporting end 303 coupled with the gripping end 301. The supporting end 303 defines a screw nut 305, the screw nut 305 is the same shape and size as the screw nut 122. The supporting end 303 is fixed to the mounting part 121 of the first side block 12 by the screw bolt 309. The first griping arm 30 and the second griping arm 40 are able to rotate around the screw bolt 309. The supporting end 303 further includes a supporting surface 307. The griping end 301 includes a griping surface 311, the griping surface 311 includes a plurality of steps 312. The steps 312 are configured to increase friction when griping an object. An open angle θ between the two griping ends 301 is determined by a size of an object being griped. The static electricity prevention device 100 further comprises a control unit (not shown), the control unit is electrically connected with the driving unit, and configured for controlling an open angle between the griping ends.

The driving unit 50 is arranged in the receiving cavity 120 of the main body 10. The driving unit 50 includes a driving arm 51 and a pneumatic cylinder 52. The pneumatic cylinder 52 includes a gas chamber 520. The driving arm 51 includes a first end 510 and a second end 512 opposite to the first end 510. The first end 510 is arranged in the gas chamber 520. The second end 512 is substantially a wedge shape. The second end 512 matches with the supporting surface 307. The driving arm 51 is able to move along an inner wall of the gas chamber 520 under impetus of gases in the gas chamber 520. The driving unit 50 is configured for driving the supporting end 303 to rotate, and to open or close the gripping end 301 to grip or release an object.

The static electricity prevention device 100 is used in a situation when an object, such as a plastic head is separate from plastic products. A method for using the static electricity prevention device 100 is as follows: the static electricity prevention device 100 is fixed above an injecting machine by the manipulator 60. The first griping arm 30 and the second griping arm 40 are driven by the driving unit 50 and the two supporting ends 303 to rotate past the slot 13 and then position outside of the receiving cavity 120 and simultaneously grip an object. The air ionizing generator 20 is configured for discharging static electricity on plastic products, ionized air from the outlet 246 is blown at the plastic products, and the products attached on a surface of the injecting machine are blown to collecting barrel.

In summary, the static electricity prevention device 100 is not only helpful for eliminating static electricity on products, but also helpful for products collection by blowing products into a collecting barrel, in this way, a phenomenon of accumulation of static electricity is prevented.

It is to be understood that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A static electricity prevention device, comprising:
   a main body defining a receiving cavity;
   an air ionizing generator mounted on the main body and configured for ejecting ionized air, the air ionizing generator comprises an ionized air generating device, an output nozzle and a pipeline connecting the output nozzle and the ionized air generating device, and the output nozzle is used to spray the ionized air, wherein the output nozzle is cubic, the output nozzle comprises a first panel, two second panels, and a third panel, the first panel is parallel to the third panel, the two second panels perpendicularly connecting the first panel and the third panel, the first panel comprises a first part and a second part connecting to the first part, the second part is tilt along a direction of away from the third panel, and an outlet is formed by the third panel, the two second panels and the second part;

a first griping arm and a second griping arm, wherein the first griping arm and the second griping arm each comprises a gripping end and a supporting end connected with the gripping end, the first griping arm and the second griping arm are pivotally mounted on an end of the main body; and a driving unit arranged in the receiving cavity, and configured for driving the supporting ends to rotate, thus to open or close the gripping ends to grip an object.

2. The static electricity prevention device of claim 1, wherein the main body comprises two first side blocks and two second side blocks, the two first side blocks are parallel to each other, the two second side blocks are parallel to each other, the two first side blocks and the two second side blocks together form the receiving cavity.

3. The static electricity prevention device of claim 2, wherein a length of the second side block is shorter than the first side block, a slot is formed between the two first side blocks and the second side block.

4. The static electricity prevention device of claim 2, wherein an end of the first side block comprises a mounting part, the mounting part defines two screw nuts, the supporting end defines a screw nut, the supporting end is fixed to the mounting part by a screw bolt, and the first griping arm and the second griping arm are able to rotate around the screw bolt.

5. The static electricity prevention device of claim 1, wherein the griping end comprises a griping surface, the griping surface comprises a plurality of steps.

6. The static electricity prevention device of claim 1, wherein the driving unit comprises a driving arm and a pneumatic cylinder, the pneumatic cylinder comprises a gas chamber, the driving arm comprises a first end and a second end opposite to the first end, the first end is arranged in the gas chamber, the driving arm is driven to move along an inner wall of the gas chamber, with a direction of closer to or away from the first griping arm and the second griping arm.

7. The static electricity prevention device of claim 6, wherein the second end is a wedge shape, and the first griping arm and the second griping arm each comprise a supporting surface respectively, the second end matches with the supporting surface.

8. The static electricity prevention device of claim 1, wherein the static electricity prevention device further comprises a manipulator, the manipulator connects with the main body and opposite to the first griping arm.

\* \* \* \* \*